(12) United States Patent
Gross

(10) Patent No.: US 7,557,775 B2
(45) Date of Patent: Jul. 7, 2009

(54) METHOD AND APPARATUS FOR EVOKING PERCEPTIONS OF AFFORDANCES IN VIRTUAL ENVIRONMENTS

(75) Inventor: David C. Gross, Decatur, AL (US)

(73) Assignee: The Boeing Company, Chicago, IL (US)

( * ) Notice: Subject to any disclaimer, the term of this patent is extended or adjusted under 35 U.S.C. 154(b) by 769 days.

(21) Appl. No.: 10/957,288

(22) Filed: Sep. 30, 2004

(65) Prior Publication Data

US 2006/0066509 A1 Mar. 30, 2006

(51) Int. Cl.
*G09G 5/00* (2006.01)
*A61B 5/04* (2006.01)

(52) U.S. Cl. .......................... 345/7; 345/633; 600/545; 382/155

(58) Field of Classification Search .................. 345/7–9, 345/632–633
See application file for complete search history.

(56) References Cited

U.S. PATENT DOCUMENTS

| | | | | |
|---|---|---|---|---|
| 5,815,411 | A | * | 9/1998 | Ellenby et al. .............. 702/150 |
| 6,124,862 | A | * | 9/2000 | Boyken et al. .............. 345/419 |
| 6,512,538 | B1 | * | 1/2003 | Hollier ........................ 348/192 |
| 6,774,885 | B1 | * | 8/2004 | Even-Zohar ................ 345/156 |
| 6,809,743 | B2 | * | 10/2004 | Ebersole et al. ............. 345/633 |
| 7,071,898 | B2 | * | 7/2006 | Hobgood et al. ............... 345/7 |

OTHER PUBLICATIONS

David Charles Gross, Affordances in the Design of Virtual Environment (a dissertation) 2004, p. 1-208.
David C. Gross, Lt Joseph Cohn, PhD; and William V. Tucker, Affordance-Based Design of Virtual Environment Training Systems: A Human-Centric Approach.
David C. Gross, Kay M, Stanney, and Lt. Joseph Cohn, Toward a Theory of Affordance Based Design of Virtual Environments.
David C. Gross, Lt Joseph Cohn, PhD; and William V. Tucker, Affordance-Based Design of Virtual Environment Training Systems: A Human-Centric Approach, Nov. 5, 2001.
David C. Gross, Kay M, Stanney, and Lt. Joseph Cohn, Toward a Theory of Affordance Based Design of Virtual Environments, Aug. 9, 2001.

* cited by examiner

*Primary Examiner*—Duc Q Dinh
(74) *Attorney, Agent, or Firm*—Yee & Associates, P.C.; Clifford G. Cousins

(57) ABSTRACT

Methods and apparatus are provided for evoking perceptions of affordances in a user/virtual environment interface. The method involves recognizing the absence or inadequacy of certain sensory stimuli in the user/virtual environment interface, and then creating sensory stimuli in the virtual environment to substitute for the recognized absent or inadequate sensory stimuli. The substitute sensory stimuli are typically communicated to the user (e.g., visually and/or audibly) as properties and behavior of objects in the virtual environment. Appropriately designed substitute sensory stimuli can evoke perceptions of affordances for the recognized absent or inadequate sensory stimuli in the user/virtual environment interface.

11 Claims, 4 Drawing Sheets

METHOD AND APPARATUS FOR EVOKING PERCEPTIONS OF AFFORDANCES IN VIRTUAL ENVIRONMENTS

TECHNICAL FIELD

The present invention generally relates to virtual environments, and more particularly relates to a method for evoking perceptions of affordances in virtual environments.

BACKGROUND

Virtual (or unreal) environments that are created by interactive computer simulation technology can be used in a wide range of applications, such as training, education, entertainment, and many other types of computer-assisted user-to-environment interfaces. An "immersive" virtual environment is typically designed to provide a user with the sense of being totally immersed in an artificial, three-dimensional world that is generated by computer software. For example, a virtual command and control station environment can be computer simulated for the purpose of training operators and station managers without the need for a physical mock-up. Virtual environments are generally implemented through the use of head mounted displays (HMD), computer screens, or some other type of display device that can be closely interfaced with the visual receptors of a user. The user typically interacts with a virtual environment through the use of input devices such as mice, joysticks, data gloves, wands, and the like. The illusion of being immersed in a virtual environment can also be enhanced through the use of auditory and other sensory technologies.

For a virtual environment (VE) to be an effective simulation of a real world environment, the VE should typically provide an immersive interactive experience for a user in as realistic an environment as possible. Recent studies of VE technology, however, have indicated that the typical user interface to a VE may be less than optimal. For example, in a training application, the VE may not be sufficiently usable, or may require excess resources to train users, or may not improve user performance as expected. These shortcomings can lead to costly and ineffective VE systems.

An improved user/VE interface may enhance the perceptive and interactive experience of the user, and could thereby increase the utility and effectiveness of the VE system. One theory of direct perception, known as "affordance" theory, can be relevant to VE system design. Affordance theory is based on the study of the interactions of an organism with objects in its environment. That is, an affordance can be defined as an intrinsic property of an object or event in an environment as perceived by a human, and how the human understands what can be done in regard to the object or event. Since affordances purport to predict the form of communication between objects and observers of an environment, VE designs that enable the realization of affordances can improve the user/VE interface to more closely simulate a real world experience.

Accordingly, it is desirable to provide a method of enabling the realization of affordances in a virtual environment. In addition, it is desirable to provide design parameter considerations for the realization of virtual environment affordances. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for evoking perceptions of affordances in a user/virtual environment interface. One method comprises the steps of recognizing the absence or inadequacy of certain sensory stimuli in the user/virtual environment interface and then creating sensory stimuli in the virtual environment to substitute for the recognized absent or inadequate sensory stimuli. The substitute sensory stimuli are typically generated by properties and behavior of objects in the virtual environment and are designed to exceed a minimum response threshold. The substitute sensory stimuli can therefore evoke perceptions of affordances for the recognized absent or inadequate sensory stimuli in the user/virtual environment interface.

An apparatus for evoking perceptions of affordances in a virtual environment comprises a processor configured with virtual reality software for generating a virtual environment on a display arrangement. The display arrangement is typically configured as a head-mounted display, a computer screen, or some other display arrangement that closely interfaces with the user. An interactive control device such as a mouse or joystick is typically coupled to the display arrangement to enable the user to interact with the virtual environment via the interactive control device. The processor is further configured to generate substitute sensory stimuli in the virtual environment to take the place of recognized absent or inadequate sensory stimuli. The substitute sensory stimuli are designed to evoke perceptions of affordances for the recognized absent or inadequate sensory stimuli in the virtual environment.

BRIEF DESCRIPTION OF THE DRAWINGS

The present invention will hereinafter be described in conjunction with the following drawing figures, wherein like numerals denote like elements.

DETAILED DESCRIPTION

Figure 1:
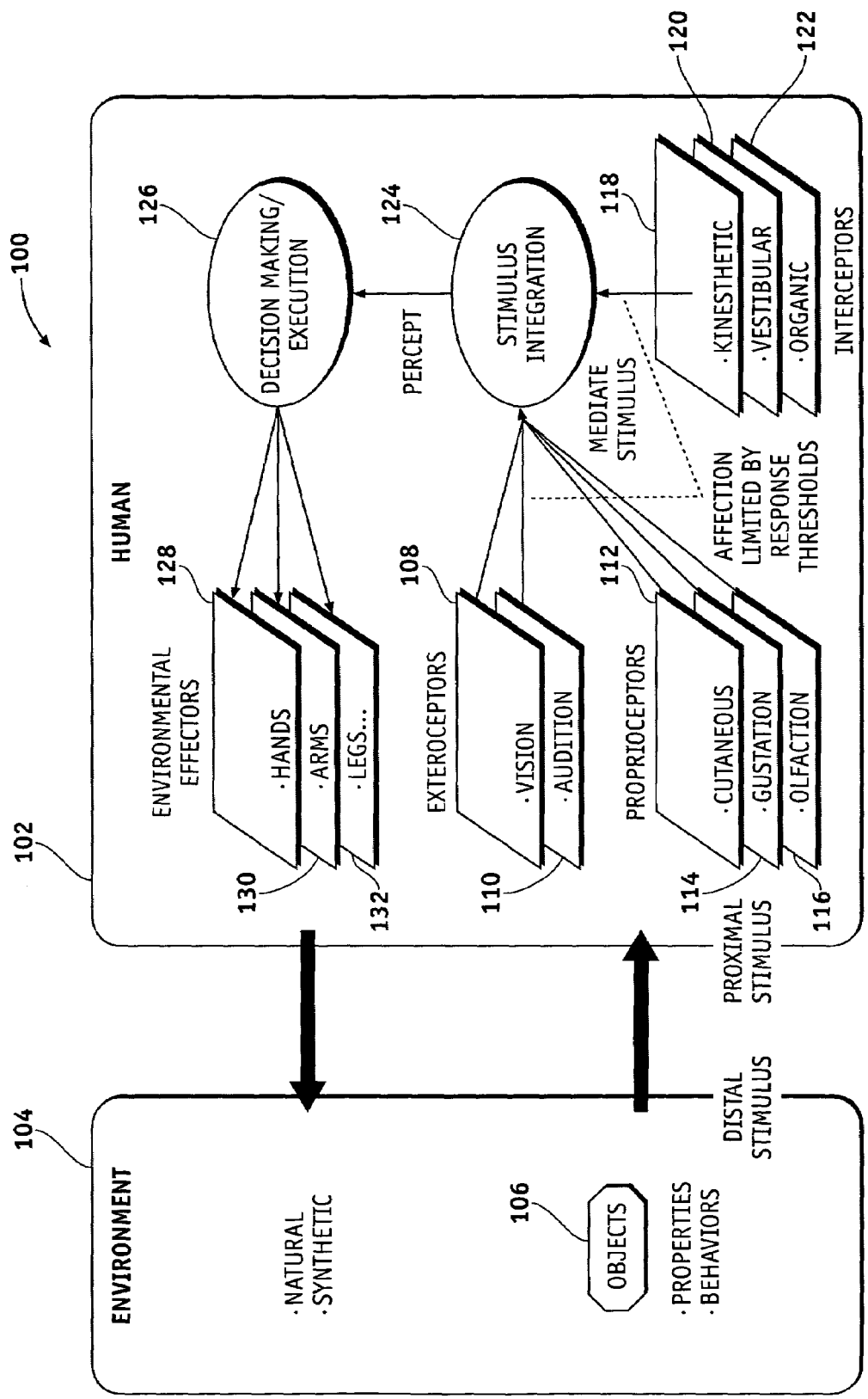
FIG. 1 is an illustration of an exemplary model for human perception based on sensory stimuli.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of virtual environment (VE) interface design. Where it is determined that certain sensory stimuli are absent or inadequate in a VE, substitutional sensory stimuli can be provided to enable the realization of affordances (sensory cues) to the user. As a result, the perceptive and interactive capabilities of the user can be enhanced through the use of substitute affordances in the VE. By improving the user/VE interface in this manner, the user can perceive a more faithful representation of the real world environment that is being simulated.

A typical VE interface design aims to present a virtual world, in which users can experience a strong sensation that they are present in, or part of, a computer-generated world. For example, a head-mounted display (HMD) can be used to present an immersive type of VE to a user. Typically, the HMD can be worn as a helmet and is generally equipped with a graphical display in the form of tiny computer screens configured as goggles. The HMD can also be equipped with other sensory devices such as earphones. Other VE configurations in current use include various types of boom-mounted head-coupled displays, computer screen arrangements and projection systems. The VE display device is typically provided with video and audio input signals generated by virtual reality software running on an external processor. In addition, the user is typically equipped with some type of input device such as a mouse or joystick that enables the user to interact with the VE.

The concept of "immersiveness", while generally engaging and vibrant, brings with it additional design issues that are not present in conventional, non-immersive, human-to-computer interaction (HCI). Existing HCI design principles typically focus on static representations, and often fail to fully incorporate theories of perception appropriate for the dynamic multimodal interactions inherent in a user/VE interface. The use of existing HCI design principles can lead to VE designs with less than optimal utility, because the users may not readily perceive the actions and functions that can and should be enacted, for example in a learning application. Therefore, it is generally desirable to integrate a comprehensive theory of perception into VE design.

One perception theory generally believed to be relevant to VE system design is known as affordance theory. Affordance theory is based on the interaction of an organism with its environment. Affordances may be defined as the inherent uses that an object in an environment furnishes to its user. As such, affordances may be thought of as a form of communication between objects and their users. Therefore, VE designs based on affordance theory can help bridge the gap between a typical HCI design and a truly immersive VE design by providing selected affordances to the user/VE interface that more closely align the perceptions of a user to those that are typically experienced in a real world environment.

An exemplary model 100 of perceptions and interactions of a typical human 102 with an environment 104 is illustrated in FIG. 1. In this general overview, environment 104 may be natural (real world) or synthetic (virtual). Objects 106 within environment 104 are assumed to have characteristic properties and behaviors. Such properties and behaviors represent typical external stimuli for the sensory perception of human 102. These external stimuli can be considered as forms of energy reflected or transmitted at the object. When measured at the object, an external stimulus is typically categorized as a distal stimulus, and when the energy reaches a sensory receptor (e.g., the eye), it is typically categorized as a proximal stimulus.

A sensory receptor that is adapted for transducing energy from an external stimulus (i.e., outside the body) is typically categorized as an exteroceptor. In the FIG. 1 model 100, a vision exteroceptor 108 and an audition exteroceptor 110 represent typical sensory receptors of human 102 for perceiving light and sound, respectively. Sensory receptors that respond to direct contact with external stimuli (e.g., pressure/temperature, taste, smell) are typically categorized as proprioceptors. In the FIG. 1 model 100, cutaneous proprioceptor 112, gustation proprioceptor 114 and olfaction proprioceptor 116 represent typical sensory receptors of human 102 for perceiving pressure/temperature, taste, and smell, respectively.

In addition to the external stimuli described above, human 102 typically experiences internal stimuli as well. Sense organs that respond to internal stimuli within the body are typically categorized as interceptors. Examples of typical interceptors are shown in the FIG. 1 model 100 as a kinesthetic interceptor 118, a vestibular interceptor 120 and an organic interceptor 122, representing sensory receptors of human 102 for internal stimuli such as body motion, balance, and thirst/hunger, respectively.

As the sensory receptors of human 102 are stimulated (stimulus integration 124), the receptors generally emit mediated stimuli in the form of nerve impulses moving to the central nervous system from the peripheral nervous system (a process called affection). This perception process is generally completed when human 102 forms a "percept", meaning that which is perceived. This percept forms a basis for other cognitive activities such as decision-making and execution 126. For example, a decision can be made to select and exercise various environmental effectors, such as a hand 128, an arm 130, or a leg 132.

Through such decisions and resulting actions, human 102 can influence environment 104, either by changing the environment itself or the position of human 102 within environment 104. As noted above, human 102 can interact with environment 104 by using a mouse or a joystick or other interactive input device (not shown). The observation of the stimuli-decision-action cycle by human 102 can engender a feedback cycle that also affects perception. As such, the specific environmental effectors available (e.g., hand 128, arm 130, leg 132) and the related experience of human 102 can influence the percepts formed. For example, human 102 can perceive that a surface is suitable for walking because of the stimuli the surface presents to the sensory receptors of human 102, and because human 102 has the availability of environmental effectors (legs 132) that are capable of walking.

The knowledge of and experience with environmental effectors typically enables human 102 to understand the available action capabilities for using those effectors, such as walking, crawling, running, and the like. Similarly, additional internal state information such as current goals, motivations, and knowledge of stature (e.g., size, reach, etc. of human 102) can also influence perception. Moreover, for a percept to be formed, such internal state information and environmental sensory stimuli must generally reach a certain intensity level and time duration. That is, some stimuli may have insufficient intensity or duration to activate a response in a particular sensory modality (e.g., sight, hearing) and therefore may fall below a minimum response threshold for the sensory receptor involved. Minimum response thresholds generally vary for each sensory modality, and may also vary for different sensory receptors within a modality, e.g., rod and cone cells in vision receptors. Stimuli failing to rise above the relevant minimum response threshold may not lead to new percepts.

As noted previously, affordance theory describes how humans directly perceive objects in their environment. For example, a chair typically affords sitting to humans. In addition, a chair can provide other affordances, such as standing, climbing, blocking, and so forth. If the goal of a human is to sit, the human typically looks for certain relevant properties of the chair. For example, humans generally want a seat that is flat, level, and knee height, and may also seek other properties such as comfort padding. There is generally an acceptability range for each property as well. That is, the seat may not need to be perfectly flat, or exactly at knee height, for example. Humans are generally known to be able to instantly adapt to a wide variety of seats, including chairs never sat on and chair designs never before seen. Therefore, a chair within an environment typically provides affordances, or potential uses, that a human can readily perceive.

Since affordances can be used to describe how humans operate and adapt to a real environment, a VE design based on affordance theory can offer a user/VE interface that behaves in a more understandable and reliable way than a VE design that is not sensitive to its affordances. Research studies of affordance theory generally conclude that affordances are realized through the integration of environmental stimuli and internal state stimuli interacting with experience gained through decision-making, which in turn affects the human knowledge of internal state, action capabilities, and body stature in the environment. This concept is illustrated in the exemplary model 200 of FIG. 2, which depicts the realization and exploitation of affordances in a typical user/VE interface.

Figure 2:
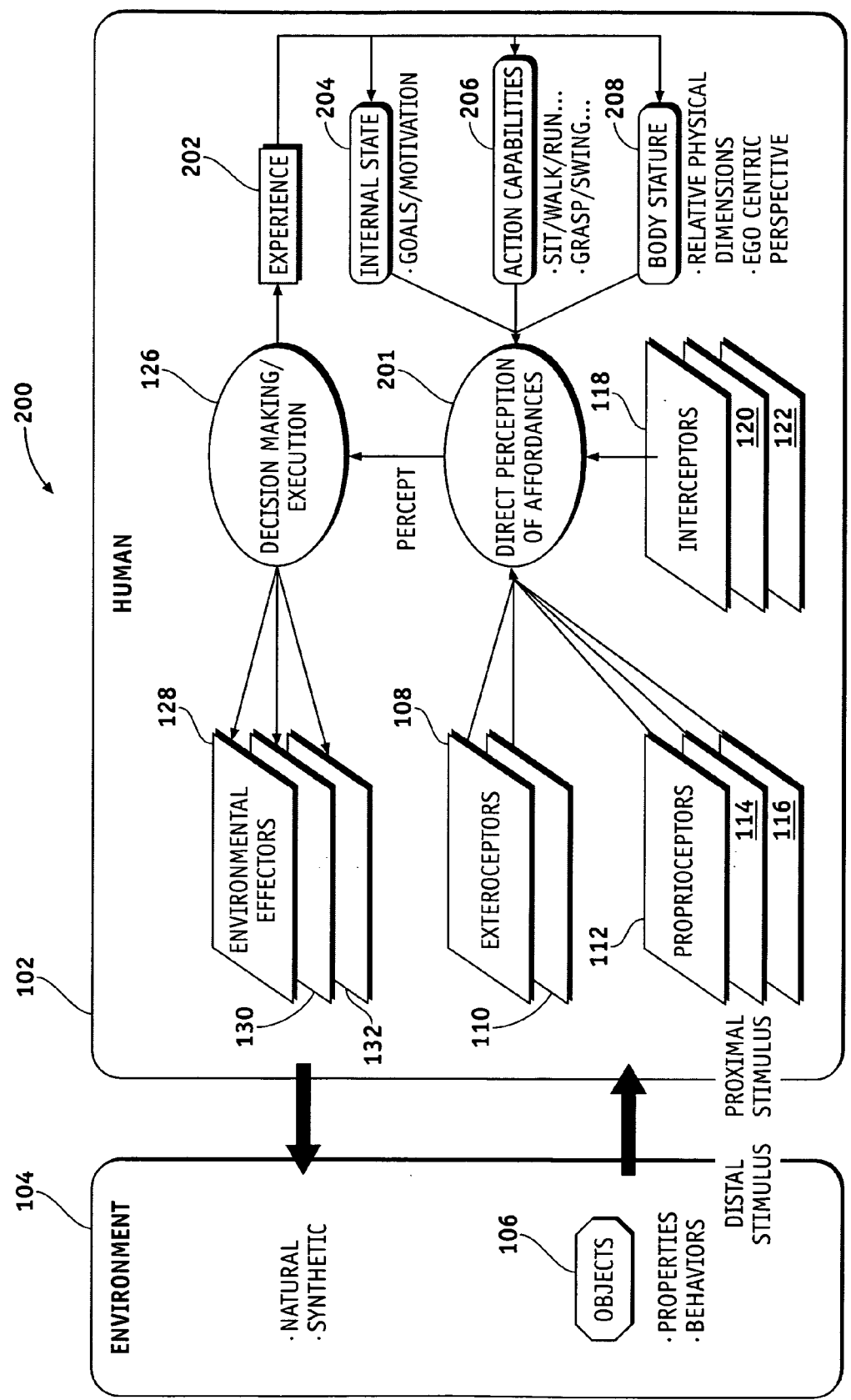
FIG. 2 is an illustration of an exemplary model for the realization and exploitation of affordances.

The stimulus integration block 124 of FIG. 1 is superseded by the direct perception of affordances block 201 of FIG. 2. In addition, a feedback loop of blocks 202, 204, 206, 208 is connected between decision-making/execution block 126 (FIG. 2) and direct perception of affordances block 201. The feedback loop represents the interaction of experience 202 gained through decision-making with state stimuli such as internal state 204, action capabilities 206, and body stature 208. In the exemplary model 200 of FIG. 2, internal state 204 examples typically include goals, motivation and spatial knowledge. Similarly, action capabilities 206 examples typically include sitting, walking, running, grasping and swinging, while body stature 208 examples typically include relative physical dimensions and an egocentric perspective.

Direct perception of affordances block 201 will typically integrate external stimuli from objects 106 (via extroceptors 108, 110, and proprioceptors 112, 114, 116), with internal stimuli (via interceptors 118, 120, 122) and with state stimuli (via internal state 204, action capabilities 206, and body stature 208) to enable the completion of a percept for cognitive activities such as decision-making and execution. As in the FIG. 1 model 100, a decision can be made (block 126) to select and exercise various environmental effectors (128, 130, 132).

Affordances may not be correctly realized in all circumstances, however, even in a natural environment. For a designed artificial environment such as a VE, certain affordances may be absent or impoverished and may not support the realization desired by their designers. In general, a basic source of failure to realize an affordance is typically an insufficient sensory stimulus; i.e., one below the minimum response threshold. For example, a failure of the proximal stimulus to activate the sensory receptors could result from an insufficient intensity level and time duration of the proximal stimulus. Other potential sources of affordance realization failure can include the absence of a desired level of multimodal sensory stimulation and/or an inadequate perception of action capabilities or body stature.

Figure 3:
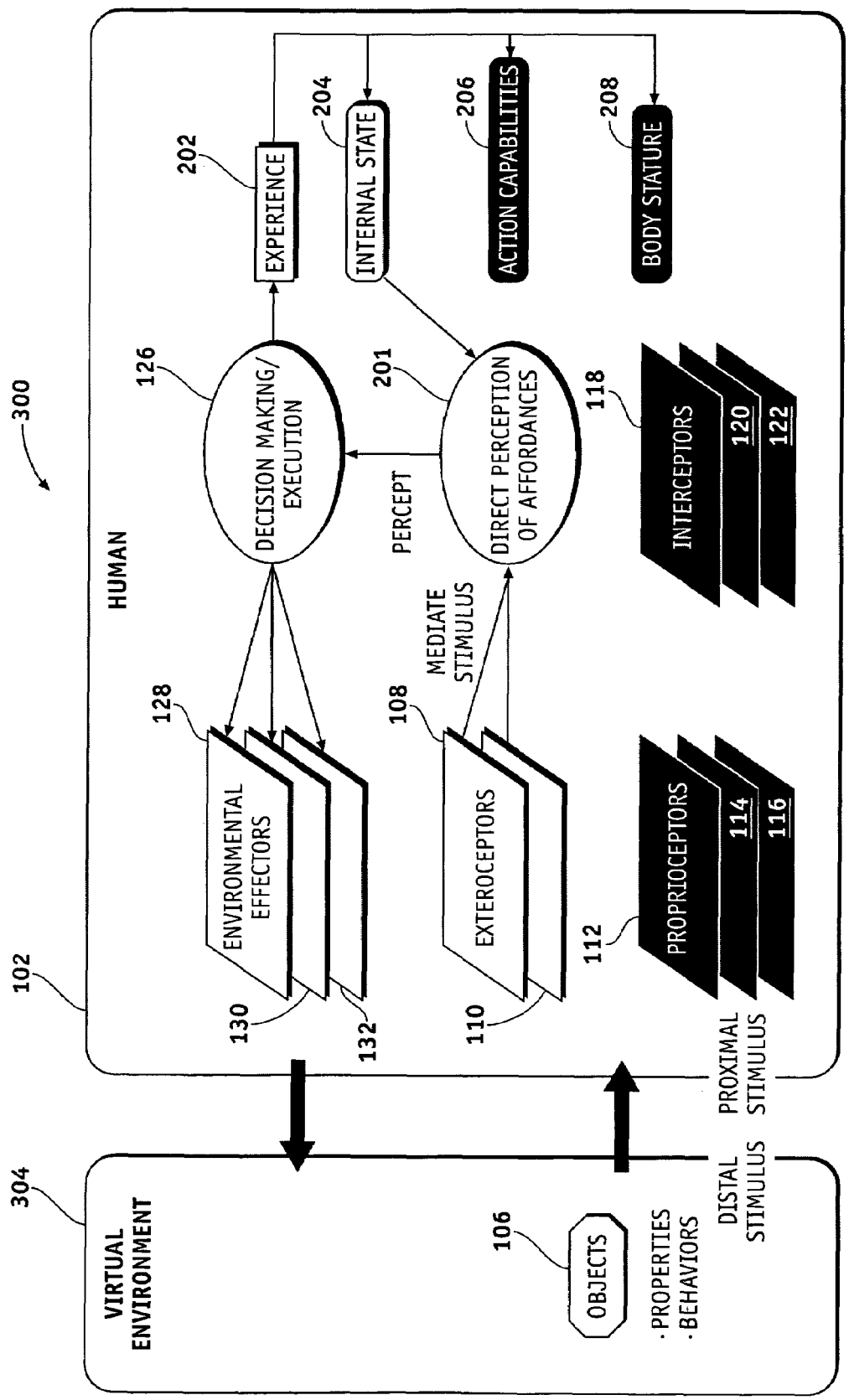
FIG. 3 is an illustration of an exemplary model of potential failures in realizing affordances in virtual environments.

The model 300 illustrated in FIG. 3 is intended to represent potential failures in realizing affordances at a user/VE interface. For example, the following types of affordance realization failures are among those that may occur between human 102 and a VE 304:
1) Insufficient sensory stimuli;
2) Insufficient multimodal sensory stimulation;
3) Inadequate perception of body stature in the environment; and
4) Inadequate perception of action capabilities in the environment.

In FIG. 3, exemplary model 300 is shown with insufficient stimuli sources, as represented by shaded proprioceptors 112, 114, 116, shaded interceptors 118, 120, 122, shaded action capabilities 206, and shaded body stature 208. As such, the arrows representing these insufficient stimuli have been eliminated between the shaded sources and direct perception of affordances block 201. As a result of these missing stimuli inputs to direct perception of affordances block 201, the percept generated by block 201 will generally be deficient for optimal decision making in block 126. For example, if human 102 is expected to pass through a virtual doorway in VE 304, the absence of body stature 208 and action capabilities 206 stimuli could prevent human 102 from knowing how to (virtually) navigate through the doorway due to the unrealized affordances. Similarly, the absence of proprioceptor stimuli (112, 114, 116) and interceptor stimuli (118, 120, 122) will typically impair the optimal interaction of human 102 with VE 304.

Since a VE represents a kind of reality that seeks to immerse a user within that reality, it is desirable that the VE behaves like reality or in easily understandable deviations from reality. Therefore, the potential breakdowns in the realization of affordances in a VE should be minimized to the greatest extent possible. To this end, studies have been made to determine methods of overcoming these potential breakdowns. Three possible methods are:
1) correlating sensory stimuli to the experience represented in the virtual world;
2) determining that a particular modality is irrelevant to the experience; or
3) substituting sensory information via another modality for missing modalities.

Of these, the latter approach, sensory information substitution, appears to have the greatest potential for success since it is generally not limited by current technology (as the first approach may be), and generally does not involve diminishment of an experience (as is likely with the second approach). As such, sensory substitution methods, to be described below, can be used to replace missing stimuli in a VE in order to evoke the realization of affordances.

Figure 4:
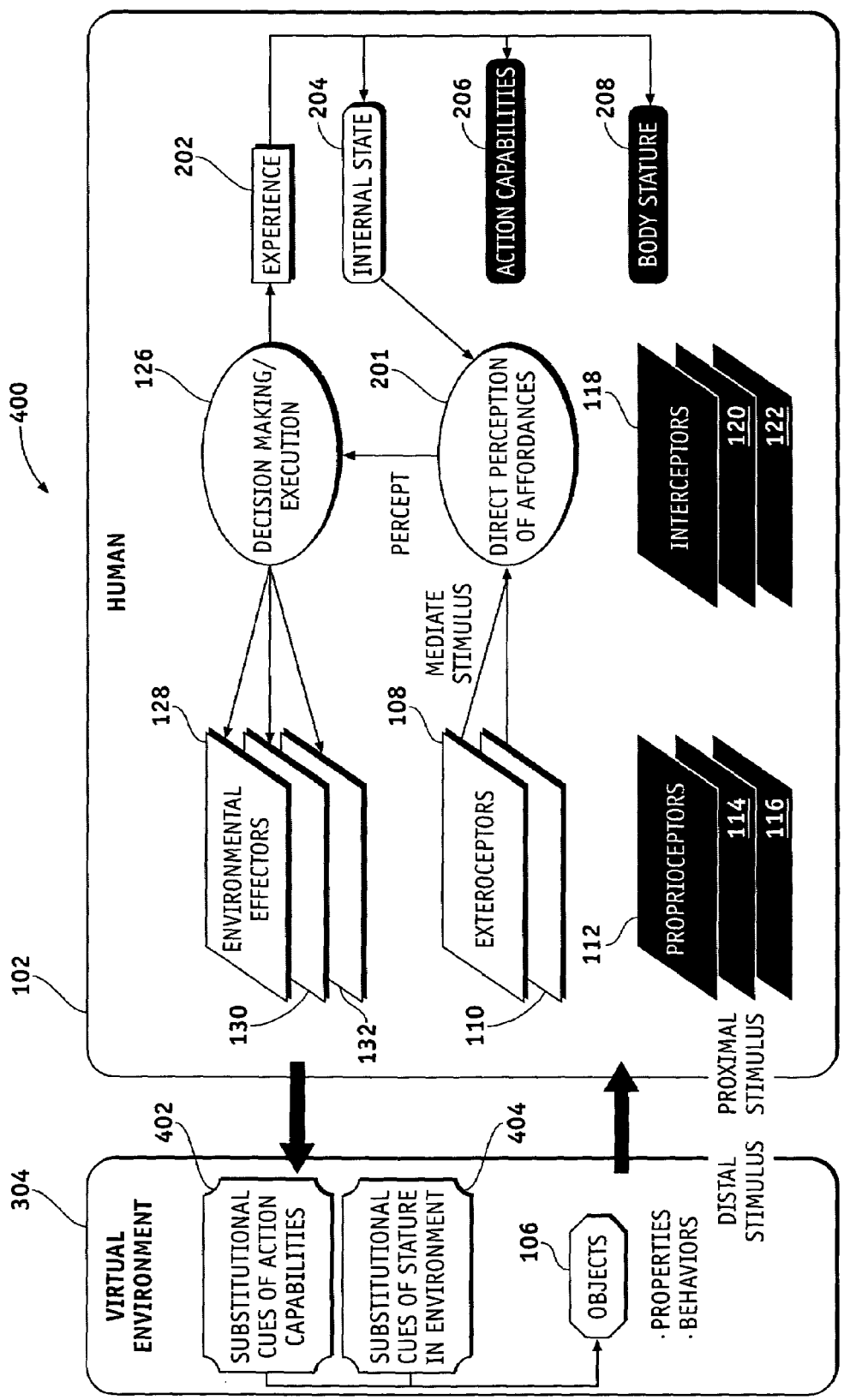
FIG. 4 is an illustration of an exemplary embodiment of a model for substituting sensory stimuli in a virtual environment to enable the realization of affordances.

According to an exemplary embodiment of a sensory substitution method 400, as illustrated in FIG. 4, substitution stimuli 402, 404 can be communicated through the properties and behaviors of objects 106 that are represented in VE 304. In general, successful sensory substitution stimuli should be designed to:
1) replace sensory modalities not represented in the virtual environment;
2) outweigh natural stimuli not correlated with the virtual environment; and
3) exceed minimum response thresholds in the modality used for the substitution.

Since the substitution stimuli are typically constrained to the properties and behaviors of objects in the virtual environment, the sensory receptors likely to be exploited are the exteroceptors and/or the proprioceptors. Generally, the more effective and convenient receptors for substitution stimuli schemes are the exteroceptors, representing the visual and auditory senses. Therefore, design parameters for substitution stimuli typically include:
1) the sensory modality (e.g., visual or auditory);
2) the magnitude of the sensory stimuli (e.g., size of a visual object, loudness of an auditory stimulus); and
3) the optimal form of the sensory stimuli (e.g., a projected human shape).

Referring again to FIG. 4, substitution stimulus 402 represents substitutional cues of action capabilities to replace the missing affordances from shaded action capabilities block 206. Similarly, substitution stimulus 404 represents substitutional cues of body stature to replace the missing affordances from shaded body stature block 208. The aforementioned substitutional cues (402, 404) can be communicated via objects 106 to exteroceptors 108 of human 102. In the aforementioned virtual doorway example described in conjunction with model 300 in FIG. 3, human 102 may have difficulty negotiating the doorway because of the missing affordances from action capabilities block 206 and body stature block 208. However, by adding substitutional cues 402, 404 to VE 304, as illustrated in FIG. 4, action capabilities and body stature affordances can be communicated via objects 106 and exteroceptors 108, 110 to direct perception of affordances block 201 of human 102. As a result, human 102 can better judge the relative size of the virtual doorway with respect to body size, and the action a body (as represented by a virtual figure) should take to navigate through the doorway.

Substitutional cues can take various forms depending on the affordance to be evoked. For example, one type of spatial affordance can be designated as a passability affordance; e.g., a doorway or passageway, or the like. An exemplary passability affordance can be evoked by the appearance of objects in a VE with appropriate gaps and edges. Moreover, the physical characteristics of the object can be communicated by visual cues relating the size of the object (e.g., shoulder width of the doorway/passageway) to the virtual representation of the human. In addition, an action capability can be provided as a (virtual) capability to rotate. A practical example of a passability affordance in a VE aircraft maintenance trainer might be the accurate realization of a user that he can experience the same limitations on access in the VE as he would in the real aircraft.

In another example, a temporal type of affordance can be designated as a catchability affordance. Substitutional cues for evoking an exemplary catchability affordance may take the form of visual and audio stimuli in the VE that indicate detectable height and speed. Moreover, the substitute stimuli may also provide visual and audio cues that indicate self-acceleration and self-speed when objects to catch will land within a predetermined range. In addition, an action capability can be provided as a (virtual) capability to move. In a practical example, a VE interface implementing training tools for air traffic controllers would typically require an accurate realization of catchability by the operator to ensure that the closure rates of different aircraft are correctly understood.

Accordingly, the shortcomings of the prior art have been overcome by providing an improved method for evoking perceptions of affordances in a virtual environment (VE). A typical VE may not provide all of the sensory stimuli to evoke user perceptions of affordances as would be experienced in the real world environment simulated by the VE. In order to improve the VE simulation, therefore, substitute stimuli may be communicated to the user via the properties and behavior of objects in the VE. If properly designed, the substitute stimuli can evoke the desired perceptions of affordances to enhance the user interaction with the VE.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of evoking perceptions of affordances in a user/virtual environment interface, comprising the steps of:
recognizing an absence or inadequacy of certain sensory stimuli in the user/virtual environment interface;
creating substitute sensory stimuli in a virtual environment using design parameters to substitute for the recognized absence or inadequacy of the certain sensory stimuli, wherein the design parameters are selected from at least one of a sensory modality, a magnitude of the substitute sensory stimuli, and an optimal form of the substitute sensory stimuli, wherein the substitute sensory stimuli evoke perceptions of affordances for the recognized absence or inadequacy of the certain sensory stimuli in the user/virtual environment interface, wherein the substitute sensory stimuli represent substitutional cues to replace missing affordances, and wherein the affordances comprise inherent uses that an object in an environment furnishes to a user of the user/virtual environment interface; and
enabling completion of a percept for cognitive activities using the substitute sensory stimuli, wherein the cognitive activities include at least one of decision-making and execution, wherein the cognitive activities influence the virtual environment by changing at least one of the virtual environment and the position of the user within the virtual environment, wherein the affordances are realized through integration of environmental stimuli of the user/virtual environment interface and internal state stimuli of the user interacting with user experience gained through the decision-making, and wherein the affordances are generated by integrating external stimuli from objects of the user/virtual environment interface, internal stimuli, and state stimuli.

2. The method of claim 1 wherein the substitute sensory stimuli comprise visual cues.

3. The method of claim 1 wherein the substitute sensory stimuli comprise auditory cues.

4. The method of claim 1 wherein the substitute sensory stimuli exceed a minimum response threshold for user perception.

5. The method of claim 1 wherein the recognized absence or inadequacy of the certain sensory stimuli relate to properties and behavior of objects in the virtual environment.

6. The method of claim 1 wherein the recognized absence or inadequacy of the certain sensory stimuli relate to body stature of the user.

7. The method of claim 1 wherein the recognized absence or inadequacy of the certain sensory stimuli relate to action capabilities of the user.

8. The method of claim 1 wherein the external stimuli are generated via extroceptors and proprioceptors.

9. The method of claim 1 wherein the internal stimuli are generated via interceptors.

10. The method of claim 1 wherein the state stimuli are generated via action capabilities and body stature.

11. A method of evoking perceptions of affordances in a user/virtual environment interface, comprising the steps of:
recognizing an absence or inadequacy of certain sensory stimuli in the user/virtual environment interface, wherein the recognized absence or inadequacy of the certain sensory stimuli relate to at least one of properties and behavior of objects in the virtual environment, body stature of the user, and action capabilities of the user; and creating substitute sensory stimuli in a virtual environment using design parameters to substitute for the recognized absence or inadequacy of the certain sensory stimuli, wherein the design parameters are selected from at least one of a sensory modality, a magnitude of the substitute sensory stimuli, and an optimal form of the substitute sensory stimuli, wherein the substitute sensory stimuli evoke perceptions of affordances for the recognized absence or inadequacy of the certain sensory stimuli in the user/virtual environment interface, wherein the substitute sensory stimuli represent substitutional cues to replace missing affordances, wherein the substitute sensory stimuli comprise at least one of visual cues and auditory cues, wherein the substitute sensory stimuli exceed a minimum response threshold for user perception, wherein the affordances comprise inherent uses that an object in an environment furnishes to a user of the user/virtual environment interface, wherein the affordances are realized through integration of environmental stimuli of the user/virtual environment interface and internal state stimuli of the user interacting with user experience gained through decision-making, wherein the affordances are generated by integrating external stimuli from objects of the user/virtual environment interface, internal stimuli, and state stimuli, wherein integrating enables completion of a percept for cognitive activities including decision-making and execution, wherein the cognitive activities influence the virtual environment by changing at least one of the virtual environment and the position of the user within the virtual environment, wherein the external stimuli are generated via extroceptors and proprioceptors, wherein the internal stimuli are generated via interceptors, and wherein the state stimuli are generated via action capabilities and body stature.

* * * * *